(12) United States Patent
Jachuck et al.

(10) Patent No.: US 7,041,751 B2
(45) Date of Patent: May 9, 2006

(54) METHOD OF POLYMERIZING PREDETERMINED CHEMICAL COMPONENTS

(75) Inventors: Roshan Jeet Jee Jachuck, Newcastle Upon Tyne (GB); Michael Jones, Hertfordshire (GB); Ian Henderson, Middlesbrough (GB)

(73) Assignee: Protensive Limited (a company incorporated in the UK), Cambridge (GB)

( * ) Notice: Subject to any disclaimer, the term of this patent is extended or adjusted under 35 U.S.C. 154(b) by 0 days.

(21) Appl. No.: 10/484,611

(22) PCT Filed: Jul. 22, 2002

(86) PCT No.: PCT/GB02/03341

§ 371 (c)(1),
(2), (4) Date: Jan. 20, 2004

(87) PCT Pub. No.: WO03/008460

PCT Pub. Date: Jan. 30, 2003

(65) Prior Publication Data

US 2004/0236039 A1   Nov. 25, 2004

(30) Foreign Application Priority Data

Jul. 20, 2001 (GB) .................................. 0117642

(51) Int. Cl.
*C08F 2/00* (2006.01)

(52) U.S. Cl. .......................................... 526/88; 526/67
(58) Field of Classification Search ................. 526/88, 526/67; 427/240
See application file for complete search history.

(56) References Cited

U.S. PATENT DOCUMENTS 4,311,570 A * 1/1982 Cowen et al. ......... 204/157.41
5,807,937 A * 9/1998 Matyjaszewski et al. ... 526/135

FOREIGN PATENT DOCUMENTS

| WO | WO 00/48728 | 8/2000 |
| WO | WO 00/48731 | 8/2000 |
| WO | WO 00/48732 | 8/2000 |

OTHER PUBLICATIONS

Boodhoo, et al, Process intensification: spinning disk reactor for styrene polymerisation, Applied Thermal Engineering, 20 (200 1127-1146.*

* cited by examiner

*Primary Examiner*—Fred Teskin
(74) *Attorney, Agent, or Firm*—Garvey, Smith, Nehrbass & North, L.L.C.; Seth M. Nehrbass; Brett A. North

(57) ABSTRACT

A method of conducting polymerisation reactions on a rotating surface reactor which allows substantially increased conversions (up to around 99%) to be achieved without a corresponding increase in polydispersity as would be expected as a result of the Trommsdorff-Norrish effect. The rotating surface reactor serves to disentangle and/or stretch growing polymer chains so as to result in better control over polymerisation kinetics.

23 Claims, 3 Drawing Sheets

METHOD OF POLYMERIZING PREDETERMINED CHEMICAL COMPONENTS

The present invention relates to methods for enhancing the kinetics of polymerisation reactions, and in particular to methods for achieving high rates of polymerisation and narrow molecular weight distribution, advantageously even at high molecular weights (for example up to 400,000 or above) and at high intrinsic viscosities (tending towards 1, for example) in reactants flowing across a spinning surface.

Processes for the production of polymers through the chemical polymerisation of various monomer species are well-known in the art. Such processes, however, tend to be either batch or continuous processes which are often carried out in relatively large volume reactor vessels which have low surface area to volume ratios. This means that there is little control over the precise reaction kinetics, since polymerisation initiation can occur at different times in different regions of the reactor volume. Although mixing within the reactor vessel can help to reduce this problem, such mixing can in fact complicate the reaction kinetics even further. This is because of 'back mixing', which means that different molecules undergo different reaction experiences depending on changes in their immediate chemical and physical environment within the reactor vessel volume.

In order to address these problems with batch processes, various 'plug flow' processes have been proposed, such as Sulzer's tubular reactor. In a plug flow process, chemical reactions occur within a small and well-defined plug volume, and while the chemical and physical environment within and around the plug volume may change over the course of the reaction, these changes are controllable and repeatable, thus providing much greater control over reaction kinetics. Plug flow processes are particularly useful for polymerisation reactions, since polymer chain lengths can be controlled by keeping a close control over the reaction time and conditions within a given plug volume. This can result in a much tighter molecular weight distribution for polymers manufactured in this way rather than by way of batch processes. However, current reactors adapted for plug flow processes have a number of disadvantages, including low surface area to volume ratios, no draw, low shear and high pressure drops at higher conversions.

It is known from GB 328,410 to provide a plug flow reactor for polymerisation reactions, the reactor comprising a spinning disc having a surface across which chemical reactants may migrate and simultaneously undergo polymerisation under the application of UV light. This prior art reference does not provide any teaching as to how such polymerisation reactions can be controlled to give tight molecular weight distributions, nor does it demonstrate any detailed disclosure of how the use of a spinning surface can be adapted specifically for polymerisation reactions.

It is also known from WO 00/48731, the full disclosure of which is hereby incorporated into the present application by reference, to provide a spinning disc reactor for the conversion of a fluid phase substrate by dynamic heterogeneous contact with a solid agent. This reference discloses the use of a spinning disc reactor for polymerising ethene (ethylene) in the presence of a Phillips catalyst coating.

Other spinning disc reactors are also described in the present applicant's further co-pending International applications WO 00/48729, WO 00/48732, WO 00/48730 and WO 00/48728, the full disclosures of which are also hereby incorporated into the present application by reference.

According to the present invention, there is provided a method of polymerising predetermined chemical components by passing these in a thin film across a surface rotating about an axis of rotation, the thin film flowing from an inner region to an outer region of the surface and polymer chains being formed and grown within the thin film; characterised in that the surface is rotated at a speed sufficient to cause the polymer chains to uncoil and/or stretch across the surface in directions extending radially thereacross from the axis of rotation.

At lower rotational speeds, for example 10 rpm on a disc of diameter 360 mm, the growing polymers tend to experience mainly or exclusively uncoiling effects, with stretching effects being additionally observed at higher rotational speeds, for example 250 rpm on a disc of diameter 360 mm.

A preferred range of rotational speeds gives rise to centrifugal accelerations on the surface in the range of 2g to 1000g inclusive (19.62 meters/second$^2$ to 9,810 meters/second$^2$), although higher or lower rotational speeds may also be effective. It will be appreciated that it is peripheral velocity of the surface that is important.

The method of the present invention has been found to result in increases in rates of polymerisation of at least one, and in some cases several, orders of magnitude when compared with traditional batch processes.

In general, reactants are supplied to a central region of the rotating surface, which may be dish shaped, vase shaped, cone shaped or, most preferably, in the form of a generally flat disc with optional surface features, which may advantageously include a central trough which may be undercut. The reactants then flow across the rotating surface to an outer periphery thereof in the form of a thin film, and reaction products are then thrown off the periphery of the surface for collection or for feeding to a further rotating surface reactor.

The reactants supplied to the central region of the rotating surface may include monomers, prepolymers, polymerisation initiators, polymer additives and solvents. Alternatively or in addition, the reactants may include, for example, catalyst, sensitizers, initiators and other additives that may enhance productivity or product quality, e.g. benzoyl peroxide, catalysts for ionic (including cationic and anionic) polymerisation. In a currently preferred embodiment, initial polymerisation may take place in a standard reaction vessel so as to form a prepolymer mixture from monomers and/or to achieve a predetermined degree of polymer conversion. The prepolymer/monomer/initiator/additive/solvent and optional polymer mixture is then transferred to the central region of the rotating surface, where continued and well-controlled polymerisation continues within the thin film so as to produce further polymer conversion, while the growing polymer chains are stretched and/or uncoiled across the rotating surface. Because the growing polymer chains are stretched and/or uncoiled, they provide easy access for unreacted monomer to join the chain even at higher conversions or in conditions of high viscosity. In some processes, the stretched and/or uncoiled chains may promote transfer to an initiator mechanism resulting in high radical concentrations that can initiate new chains with similar kinetic chain lengths. In these processes, a radical is required in addition to a monomer and/or prepolymer.

Initial polymerisation in a standard reaction vessel may comprise a degree of polymer conversion from substantially zero to a predetermined value, for example up to 10% or even up to 25% or 50% or even higher, for example 90% or even 99%. Alternatively, initial polymerisation may comprise a degree of polymer conversion from a relatively low value (i.e. where some polymer conversion has already taken place) to a relatively high value (i.e. where a greater degree of polymer conversion takes place in the standard reaction vessel). In some embodiments, prepolymers may be mixed in the standard reaction vessel and then supplied to the surface so as to form relatively long-chain polymers. In some embodiments, a polymer mixture having already undergone, say, 50% or 75% or even 90% or 99% or more conversion may be supplied to the surface so as to undergo further conversion, for example up to 95% or 99% or even 99.9% or substantially 100%. A limiting factor in terms of polymer conversion on the surface is the viscosity of the prepolymer and/or polymer mix. Generally, the mix must be fluid enough to spread over the surface in the required manner, and it will be appreciated that shear thinning effects on the rotating surface will allow even relatively viscous mixes to be converted, thereby allowing very high conversion rates.

Alternatively, a degree of prepolymerisation and/or polymerisation prior to supply to the rotating surface may be kept low or even substantially zero. In this case, conversion from 0% or 1% or the like up to 90% or even 99% may be achieved in a single passage across the surface, in multiple passages over a surface or in sequential passages over different surfaces.

In general it is desirable, for each particular polymerisation process, to select a polymer and/or prepolymer mix adapted to provide an excellent or optimised process flexibility. Embodiments of the present invention may allow processing of prepolymer mixes of 0% to 99.9% conversion, and/or may allow polymer conversions from substantially zero up to 99.9% or above on the spinning surface.

Furthermore, the molecular weight and molecular weight distribution (polydispersity) of polymers produced by way of embodiments of the present invention at degrees of conversion up to around 80% or in some cases up to around 99% or higher are substantially the same as those of polymers produced in a stirred tank reactor at degrees of conversion of only 60%. This indicates that the increased rate of polymerisation achievable on a rotating surface reactor is not due to the well-known Trommsdorff-Norrish effect, which would be expected to lead to an increase in polydispersity.

The present applicant believes the increase in rate of polymerisation to be explained with reference to the rheological concept of shear thinning and extension flow. On the surface of a rotating surface reactor used in the present invention, thin, highly sheared polymerising films may be formed. These films, which typically have an average thickness of 50 to 300 μm (although thicknesses as high as 1000 μm or more may be expected at particularly high feed rates), are associated with high mixing intensities, shear rates and plug flow characteristics. It will be appreciated that, in general, the film thickness will be greatest on the surface at a point where reactants are supplied thereto. For example, in a typical process where reactants are supplied generally to a centre of the surface, the film thickness will be greatest at the centre and will taper towards a periphery of the surface due to centrifugal effects. Initially, the shear forces may lead to disentanglement of pre-formed inactive coiled chains, thus bringing about a reduction in the viscosity of the pre-polymer mix by shear thinning. This effect may be more pronounced at higher polymer concentrations and molecular weights. As new polymer chains grow, they can be expected to experience a certain degree of extension as the polymerising film travels radially outwards under the influence of centrifugal force which increases proportionally with the radial distance ($F=\omega^2 r$, where $\omega$=angular velocity). Also, it is believed that the degree of extension will be dependent on the rotational speed of the rotating surface reactor.

Terminated and entangled polymer chains present in the pre-polymer feed to the rotating surface reactor are believed to disentangle under the prevailing shear and extension forces, thereby reducing the viscosity of the pre-polymer mix, an effect known as shear thinning. Propagating polymer chains are believed to extend and grow radially outwards with the result that translational and segmental diffusion of active chains, and therefore bimolecular termination reactions, will be reduced. On the other hand, monomer molecules will find enhanced access to the active, propagating polymer chains rather in the manner of "living polymer" systems (in the sense that propagation is the only reaction taking place). It is also thought that the lowering of viscosity by shear thinning and the excellent mixing characteristics in the thin film play an important role in maintaining high initiator efficiency even at moderate to high monomer conversions. Thus, if a high rate of initiation can be induced and sustained on the rotating surface while bimolecular termination is limited, then it is likely that non-steady state conditions would prevail on the rotating surface reactor, especially since the residence time on the rotating surface is comparable to the time to reach steady state (<5 seconds). The kinetic chain lengths of the newly-formed polymer chains are believed to be very similar to the kinetic chain lengths in the pre-polymer mix.

As the newly-formed polymer chains are extended and are growing radially, translational diffusion of the active chains becomes restricted. Segmental diffusion may similarly be affected but possibly to a lesser extent as chain ends may be sufficiently mobile and accessible to other polymeric entities. Therefore, the overall termination rate constant $k_t$ is reduced. This suggested decrease in termination between disentangled, extended polymer chains due to the physical forces acting on the rotating disc represents the opposite effect to that observed by Ludwico and Rosen (Ludwico, W. A. & Rosen, S. L., J. Polym. Sci. Chem. Ed., 14, 2121–2134; 1976). Using dilatometry, the latter found that the polymerisation rate fell as polymer-polymer interactions increased due to a shrinkage of the dimensions of the polymer coils. Consequently, diffusion control effects on termination rate were reduced, with a subsequent increase in $k_t$.

Research by the present applicant indicates that conditions on a rotating surface reactor may contribute to a reduction in cage effects which would normally result in low initiator efficiency. Under the shear thinning effect and high mixing intensities in a rotating surface reactor, the efficiency (f) of the initiator may be as high on the rotating surface as it is at the start of a stirred tank reactor polymerisation, so that the rate of initiation on the rotating surface reactor is similar to that experienced at the start of the reaction. In the physical environment on the rotating surface, the radially extended active polymer chains are readily accessible to monomer molecules and in the short residence time, propagation might be likened to that seen in "living" systems, that is, where all chain breaking reactions are suppressed.

The observation that molecular weight and polydispersity of polymer at, for example, up to 80% or 90% or 99% or even higher conversions (depending on the polymerisation being performed) from the rotating surface reactor is relatively unchanged from that formed at 60% in the stirred tank reactor clearly indicates the influence of the physical environment in the rotating surface reactor as compared to a stirred tank reactor. An increase in polymerisation rate achievable in the rotating surface reactor without sacrificing molecular weight or polydispersity indicates that the gel effect, which is normally characterised by an uncontrolled increase polymerisation rate (resulting in an increase in molecular weight and a broadening of the polydispersity index), is suppressed in the rotating surface reactor, the very short residence time probably playing a very important role.

At the present time, the relative importance of termination reactions is not completely clear. It would seem that termination by primary free radicals is a minor route since there is no significant change in polydispersity. Bimolecular termination between chains up to high conversion levels seems to indicate that primary radical termination plays only a minor role in termination in conversions of up to 80% or 90% or 99% or even higher conversions (depending on the polymerisation being performed). The diminishing monomer concentration and relatively high availability of initiating radicals would, in conventional reactors, be expected to give low molecular weight polymers and an increase in polydispersity. The observation by the present applicant of unchanged polydispersity in a rotating surface reactor seems to indicate that polymer chains having molecular weight below the critical value for entanglement are mobile enough to enter into bimolecular termination reactions with the active ends of extended, longer chains. Therefore a continuous process, such as that performed on a rotating surface reactor, giving reproducible polydispersities in the range 1.5 to 2.0 or 1.0 to 2.5 or 1.0 to 3.0 or above (for example) even at high conversions marks a considerable advance in the industrial production of polymers synthesised by the free radical mechanism. However, narrow polydispersities have also been observed for other polymerisation mechanisms such as condensation and ionic (including cationic and anionic) catalysed polymerisations. Ionic catalysed polymerisations in particular have been observed to display very narrow polydispersities.

A further advantage of embodiments of the present invention is their ability to exercise control over a degree of branching in polymerisation reactions, for example by manipulating chemical and/or mechanical parameters. Branching may be significantly reduced in some applications, or may alternatively be increased or otherwise controlled. In traditional batch processes, branching (the formation of polymer side chains) is a significant feature at conversions over about 70%. However, by controlling the degree of chain extension (linearly and/or biaxially depending on the rotational speed of the spinning surface), monomer and/or prepolymer components are encouraged to attach themselves to an appropriate end of the growing polymer chains so as to result in generally more controlled chain extension. For example, higher rotational speeds have been shown to produce a higher proportion of substantially linear polymer.

The method of the present invention has been found to be particularly effective for polymerisations including but not limited to condensation, free radical and ionic polymerisations.

Particularly with reference to condensation reactions, polymerisation and optionally devolatilisation is assisted by the enhanced mass transfer rates due to the high degree of mixing attainable in a thin film of reactant formed on a rotating surface reactor.

A further advantage provided by embodiments of the present invention is improved devolatilisation of the polymer mixture on the spinning surface. Extension of the formed polymer chains across the spinning surface, particularly in peripheral regions thereof where the growing polymer chains have terminated, appears to aid in the evaporation of (in a particular example) styrene monomer components from a mixture when carried out at elevated temperatures, for example above 250° C. At these elevated temperatures, additional monomer components are also encouraged to join the growing polymer chains, thus achieving even higher degrees of conversion as well as assisting with devolatilisation.

The present applicant has achieved exceptional degrees of devolatilisation with certain embodiments of the present invention when applied to particular polymerisations. Monomer residues in polymer product formed by embodiments of the present invention have been observed in some cases to be at most 150 ppm, and in other cases at most 2 ppm or at most 1 ppm or even at most 0.5 ppm or 0.1 ppm.

For a better understanding of the present invention, and to show how it may be carried into effect, reference shall now be made by way of example to the accompanying drawings, in which:

EXAMPLE 1

Free Radical Polymerisation of Styrene

Figure 1:
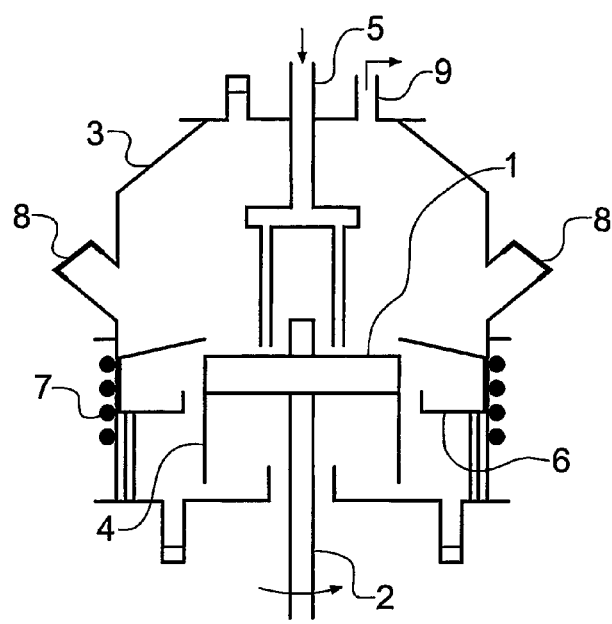
FIG. 1 shows a spinning disc reactor in schematic form.

A spinning disc reactor (SDR) as shown in FIG. 1 is set up to study the free radical polymerisation of styrene using a conventional thermal initiator, in this case, benzoyl peroxide.

Styrene was polymerised at 90° C. In a conventional stirred tank reactor using benzoyl peroxide as the free radical initiator. Toluene (10–15% v/v) was added to reduce viscosity. At 50–60% conversion the reaction mixture was pumped at the desired rate (18 to 54 kg/hr) on to a grooved brass disc held at 90° C. and rotating at speeds between 400 and 1200 rpm under a nitrogen atmosphere. A schematic of the reactor set-up is shown in FIG. 1, the reactor comprising a grooved brass disc 1 mounted on a drive shaft 2 within a housing 3. The disc 1 is provided with a skirt 4 and is fed with prepolymer mix by way of a feed 5. A polymer collection trough 6 is provided about a periphery of the disc 1 on an internal surface of the housing 3, with cooling coils 7 being fitted to a corresponding external surface of the housing 3. The housing 3 also includes viewing windows 8 and a vent 9 connected to a condenser (not shown). SDR feed and product samples were collected, quenched and analysed for conversion, molecular weight and polydispersity using a gel permeation chromatography (GPC) technique.

The prepolymer mix is observed to spread across the spinning disc 1 in the form of a thin film, and product is thrown from a periphery of the disc 1 and into the collection trough 6. Analysis of the product revealed this to contain a high concentration of polystyrene having a polymer molecular weight polydispersity substantially unchanged from that observed at the prepolymer stage and that found at >80% conversion on the spinning disc 1.

Figure 2:
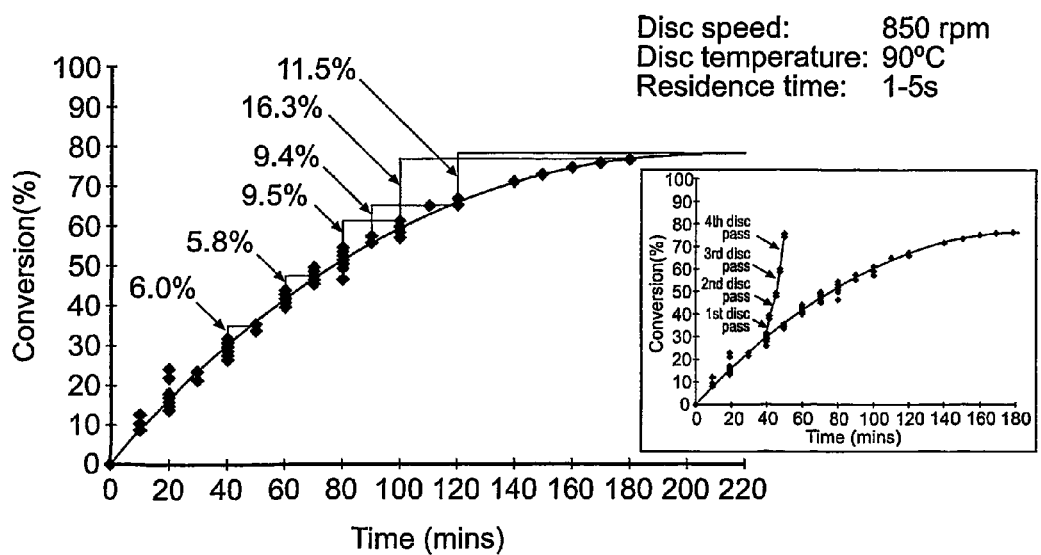
FIG. 2 is a plot comparing styrene polymerisation in batch and on a spinning disc reactor.

Increases in monomer conversion as high as about 20% were achieved in one pass across the surface of the disc (the results being presented in FIG. 2 for a rotational speed of 850 rpm), corresponding to a residence time of approximately 1 to 5 seconds. Samples of polymer taken from the SDR when conversion had reached about 80% were found to have molecular weights and polydispersities virtually identical to those found for the feed polymer at around 60% conversion. Typically the polydispersity index (PDI) was 1.8±0.2. The percentages shown in FIG. 2 are the conversion increments achieved on an SDR as compared with a stirred tank reactor having a batch reaction profile indicated by the curved plot on FIG. 2.

EXAMPLE 2

Cationic Polymerisation of Styrene

Figure 3:
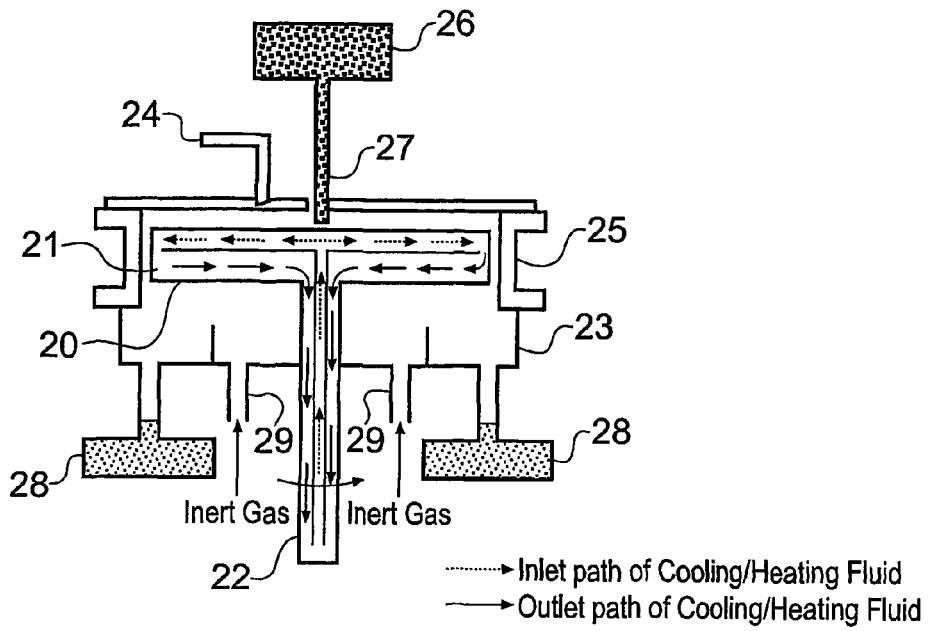
FIG. 3 shows an alternative spinning disc reactor in schematic form.

FIG. 3 shows an alternative spinning disc reactor including a hollow spinning disc 20 with an internal passage 21 for a heat transfer fluid and mounted on an axis of rotation 22. The disc 20 is enclosed within a housing 23 having a vent 24, the housing being provided with a cooling jacket 25. There is further provided a supply of monomer/catalyst 26 and a feed 27 for supplying the monomer/catalyst reactant mix to a central part of the surface of the disc 20. When the disc 20 is rotated, reactant will tend to spread across the surface of the disc 20 as a thin film, and product will be thrown from a periphery of the disc 20 for collection in reservoirs 28. An inert gas may be supplied to an interior of the housing 23 by way of pipes 29. The spinning disc reactor (SDR) of FIG. 3 was used for the cationic polymerisation of styrene using a silica supported Lewis acid catalyst. The thin, intensely mixed films produced under the centrifugal field of the rotating disc 20 are associated with high heat transfer rates (e.g. U=4–5 kW/m²K). Under such conditions of enhanced heat transfer, highly exothermic and typically uncontrollable reactions such as the cationic polymerisation of styrene can be performed under isothermal conditions even at high operating temperatures without significantly compromising on the rate of polymerisation. In comparison, attempts to control the cationic mechanism in conventional batch reactor systems so as to give a living character to the polymerisation have been introduced at the expense of reducing the rate of polymerisation to levels at or below those available in free-radical processes. Also, cationic polymerisations are conventionally carried out at very low temperatures (less than −70° C.) to control the rate and molecular weight properties.

Figure 4:
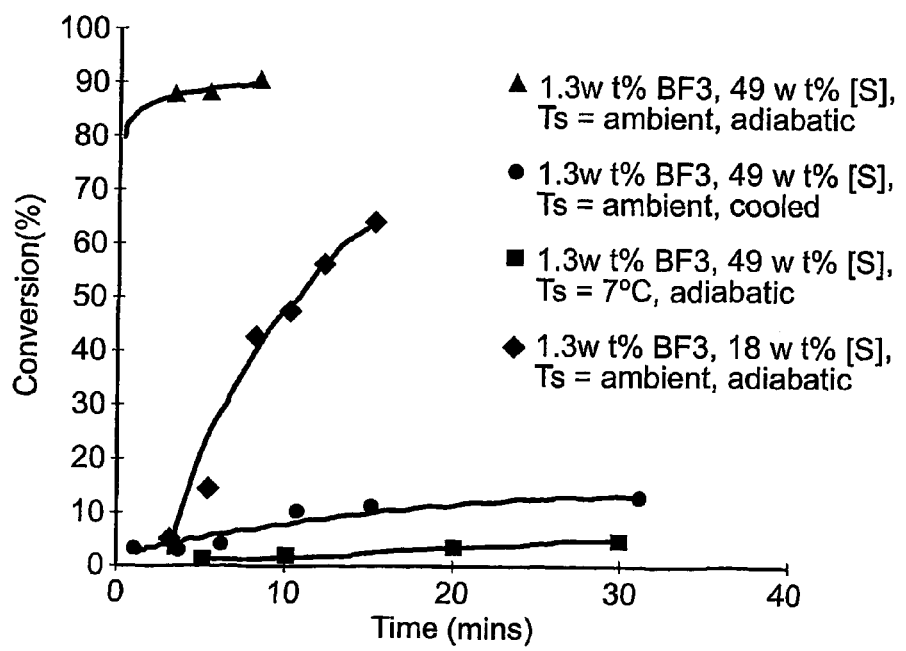
FIG. 4 is a plot relating to cationic polymerisation of styrene using 1.3 wt % BF3 under various conditions of temperature control.

Cationic polymerisations carried out in a stirred batch reactor were compared with those conducted in the SDR of FIG. 3 (with a disc of diameter 10 cm). It was observed that in a conventional stirred reactor where heat transfer is poor and where it is difficult to control the reaction temperature without any elaborate temperature control system, the highest monomer concentration which can be used for a safe, controllable polymerisation is less than 20% wt at initial ambient temperatures (see FIG. 4). By comparison, monomer concentrations as high as 75% can be used in one pass on the spinning disc 20 at 40° C., giving an essentially isothermal polymerisation with polymer having higher MN and lower polydispersity than those given at approximately 20% wt in a stirred batch reactor (Table 1). Clearly the significant reduction in solvent usage in the SDR also has environmental benefits.

The added flexibility of short (1–5 seconds or less) and controllable residence times in the SDR is important for achieving control of such rapid reactions even at a higher operating temperatures. Thus, a higher average rate of polymerisation and higher molecular weights are achievable in the SDR at 40° C. than in the cooled batch reactor at 16.7° C. using 49 wt % of styrene in 1,2-dichloroethane (Table 1). This appears to indicate that the orientation of the growing chains under the centrifugal field may cause less transfer reactions to take place in the thin SDR film even at 40° C., thus suppressing termination.

Preferably, SDR product conversion in one single pass may be increased by using a larger diameter disc or using a multi-pass system. Conversion rates of up to 99% or more may be achieved in a single pass of the disc 20. Furthermore, it may be desirable to fix the supported catalyst onto the disc surface so as to provide a more environmentally desirable polymerisation route.

TABLE 1

Cationic polymerisation in batch and SDR using 1.3 wt % BF₃ suspended in DCE

| Reactor type | [styrene] % w/w | Reaction Temp. (° C.) | Residence time (s) | Conversion (%) | Mw | Mn | PDI |
| --- | --- | --- | --- | --- | --- | --- | --- |
| Batch | 18 | 32 | 300 | 15 | 30600 | 17747 | 1.724 |
| Batch | 49 | 75.7 | 300 | 88 | 13970 | 4254 | 3.284 |
| Batch | 49 | 16.7 | 360 | 4.1 | 22005 | 14902 | 1.477 |
| SDR | 49 | 40 | 0.7 | 2.6 | 45593 | 31043 | 1.469 |
| SDR | 75 | 40 | 0.6 | 2.4 | 28910 | 21103 | 1.370 |

Figure 5:
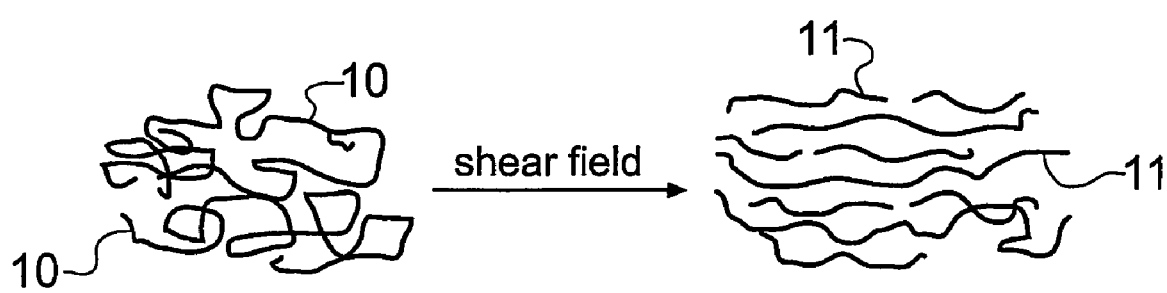
FIG. 5 shows the effect of shear on polymer coils.

FIG. 5 shows the effect of shear on entangled polymer coils 10, which become disentangled, extended polymer chains 11 in a shear field.

During preparation of the prepolymer mixture in the standard stirred reactor vessel, the instantaneous polydispersity depends on the mode of termination and usually lies between approximately 1.5 for combination and approximately 2 for disproportionation, but the ratio of number average molecular weight to weight average molecular weight (MN/MW) is temperature dependent and tends to become broadened at very high conversions. A further problem lies in the serious decline of initiator efficiency which results in a considerable lowering of polymerisation rate at very high conversions (Russel, G T et al.; Macromolecules, 21, 214102148 (1988)).

In addition to this problem, there exists a point in the polymerisation where termination becomes diffusion controlled and bimolecular reactions between growing molecular chains are restricted such that further polymerisation occurs by addition of monomer molecules. This can lead to uncontrollable exothermic reactions and has been attributed as a cause of serious explosions (Sandler, S R; Karo, W; Polymer Synthesis Vol 1, 2$^{nd}$ edition; Academic Press (1992)

p331 and references cited therein), but by using continuous feed reactors operating at high mass fractions of polymer, the rate of polymer production may be enhanced by maintaining these conditions in this regime (Lau, W et al.; Macromolecules, 20, 457 (1987)) which is known as auto acceleration or the Trommsdorff-Norrish effect.

Experiments conducted on the spinning disc reactor by the present applicant indicate that initiator efficiency is virtually unchanged from the commencement of the prepolymer stage, and therefore that more primary radical—monomer encounters occur in the poly(styrene)—styrene mixture. This leads to the formation of polymer chains having similar kinetics chain lengths to those first formed. The enhanced rate of propagation in comparison to batch process polymerisation at the same conversion levels can be attributed to the extension of the polymer chains in a shed field that exists on the spinning surface, thereby reducing the entanglement of polymer chains that are beyond their critical length for entanglement and improving the ease of styrene molecule addition through enhanced mixing. Since the polymer fragments are all flowing radially outwards at high speed (for example, in excess of 10 cm/s) and under great centrifugal force, a reduction in bimolecular termination rate is expected, which in turn results in a conservation of PDI (polydispersity index).

The above analysis implies that the spinning reactor used in the present invention should perform significantly better for more viscous prepolymer feeds, and this has been shown by the present applicant in experiments where the feed prepolymer conversion rate is increased from 25% to 60%. On the basis of these results, it is to be expected that the batch process polymerisation of styrene at moderate conversions (e.g. 25%) can be substantially duplicated on a spinning surface at high (e.g. 80%) to very high conversions (e.g. 99%). The shed field in this environment combined with excellent mixing properties within the thin film on the spinning surface would appear to overcome the problems traditionally associated with high conversion polymerisations.

The increase in the rate of polymerisation that is observed on the spinning surface, combined with almost unchanged molecular weights and polydispersities (as compared to standard batch processes) suggest that more polymer chains of the same kinetic chain length are produced on the spinning surface than are formed in the prepolymer reaction. In other words, the termination kinetics are now believed to proceed by combinations rather than, as has hitherto been thought, by primary radical reaction. For this latter mode to occur predominantly, an increase in polydispersity and lower molecular weight averages (by about half) would be expected in comparison to that found for the feed prepolymer. It would appear that the addition of monomer molecules to polymer radicals is enhanced in a more viscous system when subjected to the conditions prevailing on the spinning surface.

In conclusion, the present invention would appear to allow significant enhancement of rates of polymerisation in a simple manner, as opposed to standard continuous feed reactors (Lau, W et al.; Macromolecules, 20, 457 (1987)) or the more recent use of thermal polymerisation using nitroxyl mediation, a procedure that requires high temperatures (>125 C) and long reaction times (>20 hours) (Davenport, W et al.; Macromolecules, 30, 1929–34 (1997)).

The results obtained by the present applicant appear to demonstrate that it is possible to induce an acceleration in the polymerisation of styrene without compromising either molecular weight or polydispersity by conducting the polymerisation in a spinning disc reactor. The enhancement of rate is achieved in a safe and controllable manner, in sharp distinction to the auto-acceleration observed in conventional reactors.

The use of continuous feed reactors at high mass fractions of polymer is an industrial technique for conducting free-radical polymerisations in the Trommsdorff-Norrish region in a controllable way (Russell, G. T. et al., Macromolecules, 21:2133; 1988). An example of this approach has been reported by Lau et al. On the basis of preliminary results obtained by the present applicant, it is believed that a continuous process, such as the one involving a spinning disc reactor, would mark a significant advance in the industrial production of polymers having polydispersities close to the theoretical limit in a controlled and reproducible manner. This technology is expected to offer opportunities for developing sustainable polymer processes using the concepts of process intensification.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives of steps.

The invention claimed is:

1. A method of polymerising predetermined chemical components by passing these in a thin film across a surface rotating about an axis of rotation, the thin film flowing from an inner region to an outer region of the surface and being thrown therefrom, and polymer chains being formed and grown within the thin film, wherein the surface is rotated so as to cause the polymer chains to uncoil and/or stretch across the surface in directions extending radially thereacross from the axis of rotation wherein the thin film has an average thickness of 10 to 300 µm, wherein branching of the growing polymer chains is controlled by variation of chemical or mechanical process parameters.

2. A method of polymerising predetermined chemical components by passing these in a thin film across a surface rotating about an axis of rotation, the thin film flowing from an inner region to an outer region of the surface and being thrown therefrom, and polymer chains being formed and grown within the thin film, wherein the surface is rotated so as to cause the polymer chains to uncoil and/or stretch across the surface in directions extending radially thereacross from the axis of rotation wherein the thin film has an average thickness of 10 to 300 µm, wherein the polymerisation is an ionic polymerisation.

3. A method of polymerising predetermined chemical components by passing these in a thin film across a surface rotating about an axis of rotation, the thin film flowing from an inner region to an outer region of the surface and being thrown therefrom, and polymer chains being formed and grown within the thin film, wherein the surface is rotated so as to cause the polymer chains to uncoil and/or stretch across the surface in directions extending radially thereacross from the axis of rotation wherein branching of the growing polymer chains is controlled by variation of chemical or mechanical process parameters.

4. A method according to claim 3, wherein the surface is rotated at a speed sufficient to generate a centrifugal acceleration of 19.62 meters/second$^2$ to 9,810 meters/second$^2$ inclusive.

5. A method according to claim 3, wherein polymerisation reaches at least 80% conversion.

6. A method according to claim 5, wherein polymerisation reaches at least 85% conversion.

7. A method according to claim 5, wherein polymerisation reaches at least 90% conversion.

8. A method according to claim 5, wherein polymerisation reaches at least 99% conversion.

9. A method according to claim 3, wherein components contained within the thin film and thrown from the outer region of the surface are recycled to the inner region of the surface or passed as feedstock to an inner region of a further rotating surface.

10. A method according to claim 3, wherein the thin film has an average thickness of 50 to 300 μm.

11. A method according to claim 3, wherein the thin film has an average thickness of 10 to 300 μm.

12. A method according to claim 3, wherein the thin film has an average thickness of 10 to 100 μm.

13. A method according to claim 3, wherein a polymer produced by the method has a polydispersity index in the range 1.0 to 3.0 inclusive.

14. A method according to claim 3, wherein residual monomer components are devolatilised from the surface.

15. A method according to claim 14, wherein residual monomer components in polymer product thrown from a periphery of the surface have a concentration not greater than 150 ppm.

16. A method according to claim 14, wherein residual monomer components in polymer product thrown from a periphery of the surface have a concentration not greater than 2 ppm.

17. A method according to claim 14, wherein residual monomer components in polymer product thrown from a periphery of the surface have a concentration not greater than 1 ppm.

18. A method according to claim 3, wherein the predetermined chemical components include a prepolymer mix.

19. A method according to claim 3, wherein the predetermined components include monomers with optional additives.

20. A method according to claim 3, wherein the polymerisation is a condensation polymerisation.

21. A method according to claim 3, wherein the polymerisation is a free radical polymerisation.

22. A method according to claim 3, wherein the polymerisation is an ionic polymerisation.

23. A method of polymerising predetermined chemical components by passing these in a thin film across a surface rotating about an axis of rotation, the thin film flowing from an inner region to an outer region of the surface and being thrown therefrom, and polymer chains being formed and grown within the thin film, wherein the surface is rotated so as to cause the polymer chains to uncoil and/or stretch across the surface in directions extending radially thereacross from the axis of rotation, wherein the polymerisation is an ionic polymerisation.

* * * * *